United States Patent
Turner

(10) Patent No.: US 7,083,180 B2
(45) Date of Patent: Aug. 1, 2006

(54) ADJUSTABLE BICYCLE SEAT ASSEMBLIES AND METHODS OF USE

(75) Inventor: Paul H. Turner, Boulder, CO (US)

(73) Assignee: Maverick American LLC, Boulder, CO (US)

( * ) Notice: Subject to any disclaimer, the term of this patent is extended or adjusted under 35 U.S.C. 154(b) by 0 days.

(21) Appl. No.: 10/954,963

(22) Filed: Sep. 29, 2004

(65) Prior Publication Data

US 2006/0066074 A1    Mar. 30, 2006

(51) Int. Cl.
 *B62K 15/00* (2006.01)
(52) U.S. Cl. ...................... 280/287; 188/300
(58) Field of Classification Search ........... 280/278, 280/287; 188/300
See application file for complete search history.

(56) References Cited

U.S. PATENT DOCUMENTS

| | | | |
|---|---|---|---|
| 5,397,111 A * | 3/1995 | Knopp et al. ............ 267/64.12 |
| 5,580,034 A | 12/1996 | Cheng | |
| 5,620,067 A * | 4/1997 | Bauer et al. ............ 188/322.19 |
| 5,829,733 A | 11/1998 | Becker | |
| 6,056,251 A * | 5/2000 | Knopp et al. ................ 248/161 |
| 6,139,039 A | 10/2000 | Becker | |
| 6,176,476 B1 | 1/2001 | Wang | |
| 6,263,531 B1 * | 7/2001 | Navarro et al. ................ 5/648 |
| 2004/0208687 A1 * | 10/2004 | Sicz et al. ............... 403/109.3 |
| 2005/0161576 A1 * | 7/2005 | Boehm et al. .............. 248/631 |

FOREIGN PATENT DOCUMENTS

| JP | 2002037158 A | * | 2/2002 |
|---|---|---|---|
| JP | 2002242975 A | * | 8/2002 |

* cited by examiner

*Primary Examiner*—Kevin Hurley
(74) *Attorney, Agent, or Firm*—Townsend and Townsend and Crew

(57) ABSTRACT

Adjustable height bicycle seat mounting assemblies, bikes using such assemblies, and methods of use are provided. One such adjustable height bicycle seat mounting assembly includes first and second tubes in telescoping arrangement. The first tube is adapted to be coupled to a bicycle frame and the second tube is adapted to be coupled to a bicycle seat. A bulkhead is disposed in one of the first and second tubes. The bulkhead has an orifice therethrough, with a rod extending through the orifice and coupled to a movement device disposed near an end of the second tube. The first and second tubes are axially adjustable relative to one another by regulating a flow of a fluid disposed in the first and second tubes.

30 Claims, 5 Drawing Sheets

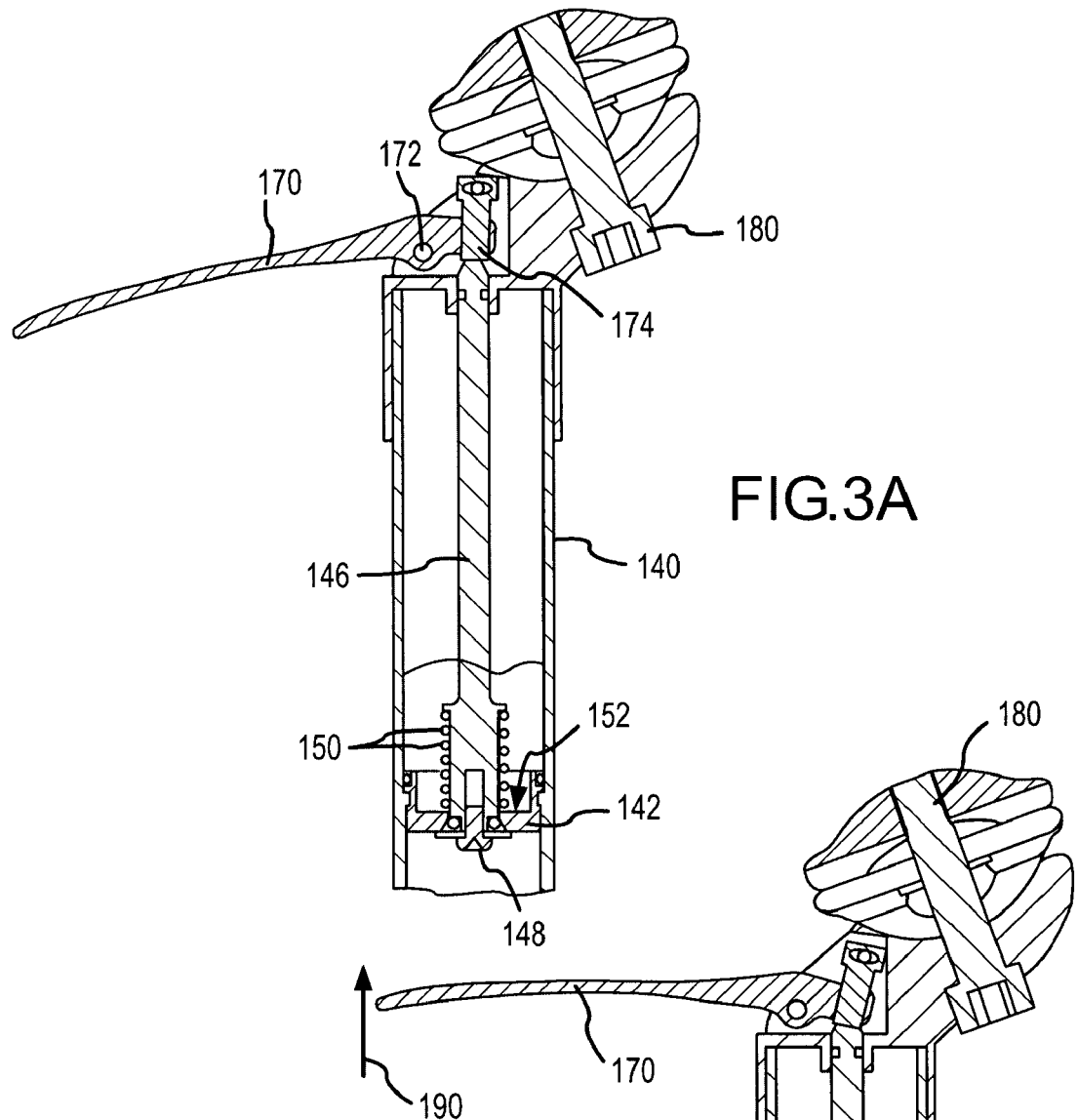

ADJUSTABLE BICYCLE SEAT ASSEMBLIES AND METHODS OF USE

BACKGROUND OF THE INVENTION

The present invention relates generally to bicycle seats, and more specifically, to adjustable height bicycle seat mounting assemblies, bikes using such assemblies, and methods of use.

The function of a bicycle seat post is to connect the rider's seat to the bicycle frame in a manner that allows an adjustment of the seat position to accommodate riders of different leg lengths. Typically, seat posts are cylindrical in shape and are adjusted by telescoping the seat post into a vertical tube member of the bicycle frame. The post is held in position by a clamp mechanism at the point where the post enters the frame tube. The clamp may use a simple bolt to provide the clamp force, or utilize a lever so as to eliminate the need for a tool while the rider is in the field. A bicycle seat typically attaches to the seat post by a pair of parallel rails extending out of the bottom of the seat, and a clamp at the top of the seat post. This also provides a way to adjust the fore and aft position of the seat.

A bicycle seat is normally adjusted to give the rider's legs near full extension at the bottom of the pedal stroke, so as to provide the maximum power and efficiency to the rider. However, terrain may be encountered where a lower seating position is desired to provide a lowered center of gravity and better handling. A lowered seat position is also especially beneficial when negotiating steep downhill terrain, so the rider is less prone to falling over the handlebars.

The problem in the current art is the time and/or complication of making a seat height adjustment, and the inability of the tubular shape to hold the seat in a rotationally-aligned condition when a height adjustment is made. Improvements are desired.

BRIEF SUMMARY OF THE INVENTION

The present invention relates generally to bicycle seats, and more specifically, to adjustable height bicycle seat mounting assemblies, bikes using such assemblies, and methods of use. Seat mounting assemblies of the present invention will be particularly useful to allow riders to adjust the seat height while riding the bike, or in the field without the need for tools or other devices.

In one embodiment of the present invention, an adjustable height bicycle seat mounting assembly includes first and second tubes in telescoping arrangement, with the first tube adapted to be coupled to a bicycle frame and the second tube adapted to be coupled to a bicycle seat. A bulkhead is disposed in one of the first and second tubes. The bulkhead has an orifice therethrough, with a rod extending through the orifice and coupled to a movement device disposed near an end of the second tube. The first and second tubes are axially adjustable relative to one another by regulating a flow of a fluid disposed in the first and second tubes.

In some aspects, the movement device opens the orifice by moving the rod. The movement device can be a lever, a cable, a pin, and the like. The movement device is preferably positioned where a bike rider can easily reach it, such as mounted to the second tube under the bicycle seat. The mounting assembly may further include a biasing member adapted to bias the rod towards a position to close the orifice. The biasing member comprises a spring, in one aspect, and may further include a sealing member adapted to seal the orifice. In one aspect, a piston is provided, disposed in the first tube. The piston is adapted to direct the fluid towards the orifice when the orifice is opened and an axially compressive force is applied to the bicycle seat.

In some embodiments, the seat mounting assembly includes a means for arresting rotational movement between the first and second tubes. This may occur, for example, using a tongue and groove arrangement between the outer surface of the inner tube, and the inner surface of the outer tube. Alternative devices for preventing some or all of the rotational movement between the two tubes include a slot and key arrangement, external linkages, interlocking shapes between the outer surface of the inner tube and the inner surface of the outer tube, and the like.

In some embodiments, the first and second tubes are closed at opposing ends. In one aspect, a compressible gas is disposed in the closed end portion of the second tube above the bulkhead. The compressible gas creates a biasing effect on the fluid when the orifice is opened to bias the first and second tubes towards an extended positioned. In another aspect, the compressible gas is disposed in the closed end portion of the first tube. In that case, the compressible gas creates a biasing effect on a seal disposed at an open end of the second tube. In some aspects, the biasing effect is adapted to be overcome with an axially compressive force applied to the bicycle seat. In this manner, a rider can compress the two tubes by applying a force to the bicycle seat. The force, for example, may be some or all of the rider's body weight applied by sitting on the seat.

In another embodiment, an adjustable height bicycle seat mounting assembly according to the present invention includes outer and inner tubes in telescoping arrangement with each other and each having a closed end. A bulkhead is disposed in the inner tube having an orifice therethrough. An orifice seal is adapted to open and close the orifice. A substantially incompressible fluid is disposed within at least a portion of the outer tube and within at least a portion of the inner tube. The substantially incompressible fluid is adapted to pass through the orifice when the orifice is in an open position. A compressible gas is disposed in at least one of the outer tube closed end and inner tube closed end. The compressible gas is adapted to provide a biasing effect on the fluid when the orifice is in the open position to bias the inner and outer tubes towards an extended position.

The present invention further provides bicycles having an adjustable height seat mounting assembly. The seat mounting assembly is axially fixed when a sealing device is in a first position relative to a bulkhead orifice, and is axially adjustable when the sealing device is in the second position. In some aspects, the seat mounting assembly includes a means for arresting rotational movement between two telescoping tubes. In a particular aspect, the means for arresting rotation movement operates to arrest rotational movement when the first and second tubes are axially adjusted. In this manner, the rider can adjust the seat height without the seat twisting or turning out of alignment with the bicycle frame or the rider.

The present invention further provides methods of adjusting a bicycle seat height using, for example, seat mounting assemblies as described herein. In one such method, a movement device such as a lever, cable, or the like is moved to open an orifice through which fluid can pass. The movement device is released to seal the orifice when the seat is at a desired location. Seat adjustment may further involve applying a compressive load to the seat to cause the first and second tubes to telescope to a desired position. In some aspects, the compressive load is greater than a biasing effect of the seat assembly in order to lower the seat desired position. In other aspects, the biasing effect is greater than the compressive load to raise the seat desired position. This may also occur when no compressive load is applied to the seat when the orifice is opened.

Other objects, features, and advantages of the present invention will become more fully apparent from the following description, the appended claims, and the accompanying drawings.

BRIEF DESCRIPTION OF THE DRAWINGS

FIGS. 3A and 3B depict a portion of a seat mounting assembly according to an embodiment of the present invention depicting a closed bulkhead (FIG. 3A) and an open bulkhead (FIG. 3B);

DETAILED DESCRIPTION OF THE INVENTION

Figures 1A, 1B:
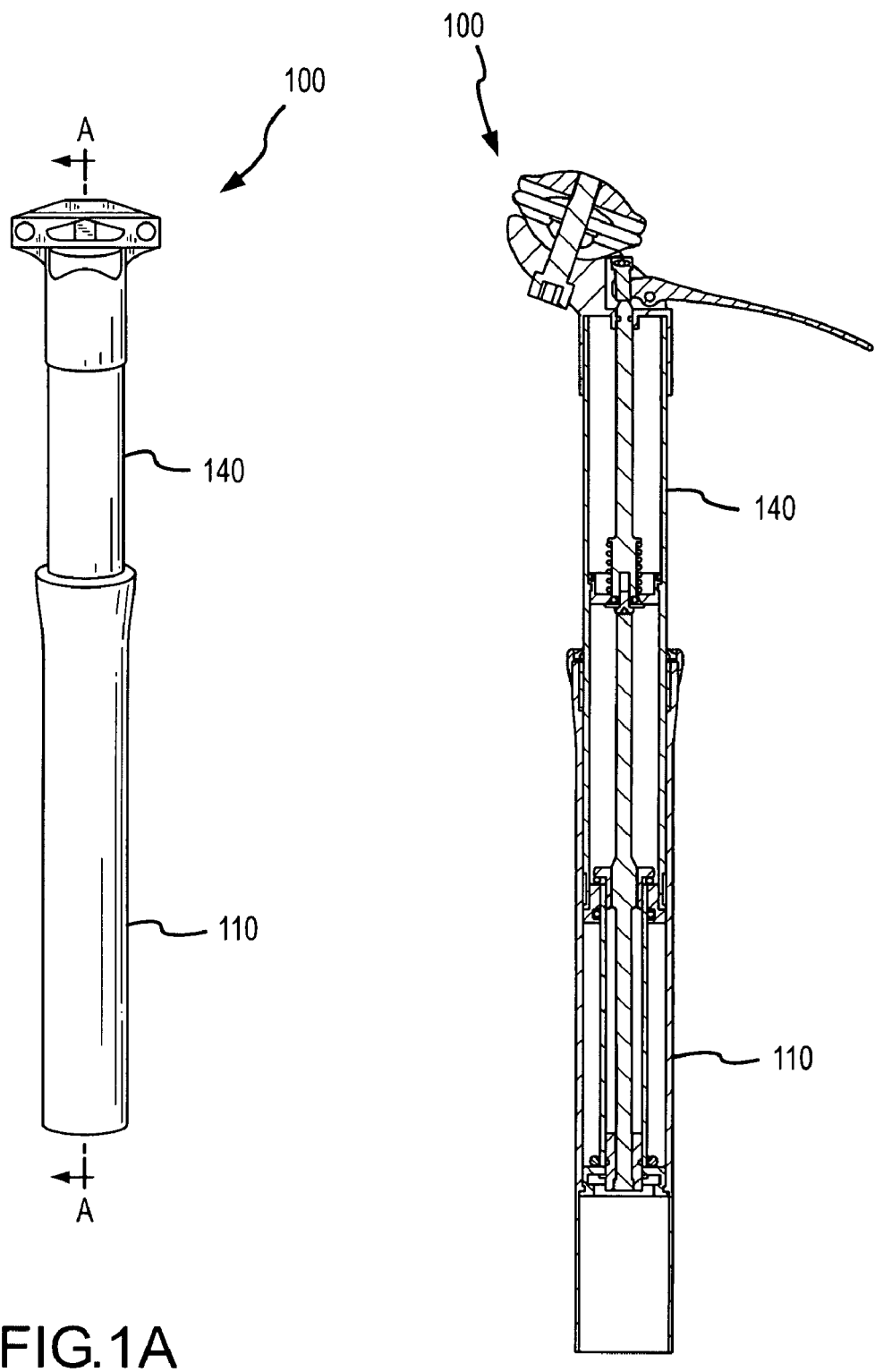
FIG. 1A is an overall view of a seat mounting assembly according to an embodiment of the present invention.
FIG. 1B is a cross-sectional view of the seat mounting assembly depicted in FIG. 1A.

Turning now to FIGS. 1A–3B an embodiment of an adjustable height bicycle seat mounting assembly 100 will be described. FIG. 1A depicts seat mounting assembly 100 having two telescoping tubes. A first or outer tube 110 is adapted to receive a second or inner tube 140. Tubes 110, 140 are in telescoping arrangement in order to raise and lower a bicycle seat to a desired height as further detailed below. While outer tube 110 is shown as the lower of the two tubes, outer tube 110 may be the upper tube in an alternative embodiment. FIG. 1B depicts a side cross-sectional view of seat mounting assembly 100 of FIG. 1A. Details on the components and functions of seat mounting assembly 100 will be further described with reference to FIGS. 2A and 2B.

Figures 2A, 2B:
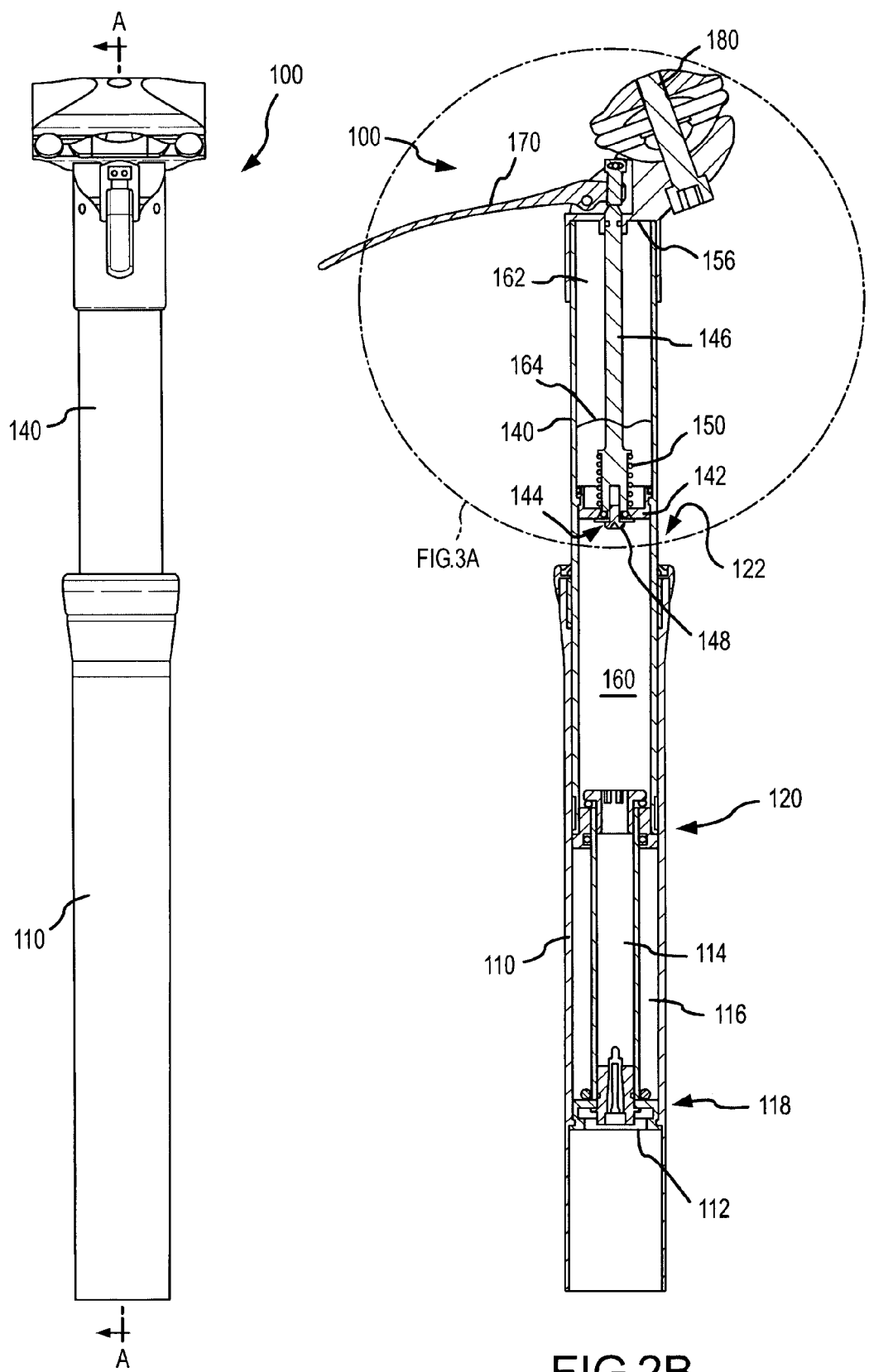
FIG. 2A is a front view of a seat mounting assembly according to an embodiment of the present invention.
FIG. 2B is a cross-sectional side view of the seat mounting assembly shown in FIG. 2A.

As best seen in FIG. 2B, in one embodiment first tube 110 has a closed end 112 and an open end 122. Open end 122 is adapted to receive inner or second tube 140 in a sliding or telescoping arrangement. Seat mounting assembly 100 uses internal pressures of gases and/or fluids within tubes 110, 140 to control the telescopic height or position of tubes 110 and 140 relative to one another. In this manner, the height of a bicycle seat coupled to assembly 100 may be controlled. In a particular embodiment, closed end 112 has a sealing member 118 and a piston 114 extending from end 112. Sealing member 118, in one embodiment, is adapted to hermetically seal closed end 112. First tube 110 further includes a second sealing member 120 that is adapted to engage a lower edge or open end of second tube 140. Second sealing member 120 and sealing member 118, in one embodiment, operate to define a chamber 116 in which piston 114 at least partially resides. In one embodiment, chamber 116 is a gas or air-filled chamber. Sealing members 118 and 120 may include a variety of components including rigid structures such as bulkheads, and the like, as well as elastic components such as rubber O-rings, and the like. A particular embodiment of sealing members 112 and 120 will be further described with reference to FIG. 4.

Second tube 140 includes a bulkhead 142 disposed therein. In one embodiment, bulkhead 142 spans the entire cross-section of second tube 140 and has an orifice or opening 144 disposed therethrough. Orifice 144 is adapted to permit a fluid to pass through bulkhead 142 as described in further detail below. Seat mounting assembly 100 includes a rod 146 that extends from an upper closed end 156 of second tube 140. In one embodiment, rod 146 extends to bulkhead 142. As best seen in FIG. 2B, rod 146 includes or is coupled to a sealing member 148 disposed at an end of rod 146. Sealing member 148 is adapted to seal orifice 144 when rod 146 is at a raised position. In one embodiment, a biasing member 150 operates to bias rod 146 such that sealing member 148 seals orifice 144. Forces applied by biasing member 150 may be overcome when a user of seat mounting assembly 100 wants to raise or lower a bicycle seat position.

Second tube 140 has a cavity 162 formed therein. In one embodiment, cavity 162 extends from closed end 156 to about bulkhead 142. In one embodiment, cavity 162 contains a compressible fluid or gas, which may include air, nitrogen, an inert gas, or the like. The compressible fluid or gas substantially fills cavity 162 above a fluid level 164. Fluid level 164, in one embodiment, is above bulkhead 142. Rod 146 passes through an opening in closed upper end 156 of second tube 140. The opening may include a seal disposed adjacent thereto to provide a hermetic and/or fluidic seal around rod 146. In this manner, gas and/or fluid is generally maintained within cavity 162. Rod 146 is adapted to engage a movement device 170, which in one embodiment is a lever 170 as shown in FIG. 2B. In alternative embodiments, movement device 170 may comprise a pin, a cable, or the like. Movement device 170 is positioned and designed to permit a user or bicycle rider to open orifice 144 to control a bicycle seat height. Seat mounting assembly 100 further includes a seat post 180 for coupling seat mounting assembly 100 to a bicycle seat (not depicted in FIG. 2B).

Turning now to FIGS. 3A and 3B, additional details on the operation of seat mounting assembly 100 will be described. FIG. 3A depicts rod 146 in a position such that orifice 144 is closed. Again, orifice 144 may be closed by sealing member 148, which comprises a plug, a cap, an O-ring, or the like. Rod 146 is biased to close orifice 144 by biasing member 150. Biasing member 150 is depicted as a spring in FIG. 3A, although other biasing members may be used within the scope of the present invention, including other compressive devices, elastic devices, and the like. In one embodiment, biasing member 150 engages a shoulder 152 of bulkhead 142. When rod 146 is depressed, biasing member 150 compresses against shoulder 152 and sealing member 148 is lowered relative to bulkhead 142 as shown in FIG. 3B. In this manner, sealing member 148 no longer blocks or covers orifice 144, and air, fluid, or the like may pass through orifice 144. Rod 146 is lowered, in one embodiment, by providing an upward force on lever 170 as depicted by arrow 190. Application of force 190 causes lever 170 to rotate about a rotation point 172. A coupler 174 coupled to or near an end of lever 170 operates to depress rod 146 in the direction indicated by arrow 192. Rod 146 in turn forces sealing member 148 away from orifice 144 while biasing member 150 compresses against shoulder 152. The release of force 190 causes biasing member 150 to return rod 146 to the position depicted in FIG. 3A. In this manner, fluid or gas may no longer pass through orifice 144 as orifice 144 is sealed or blocked by sealing member 148.

Figure 5:
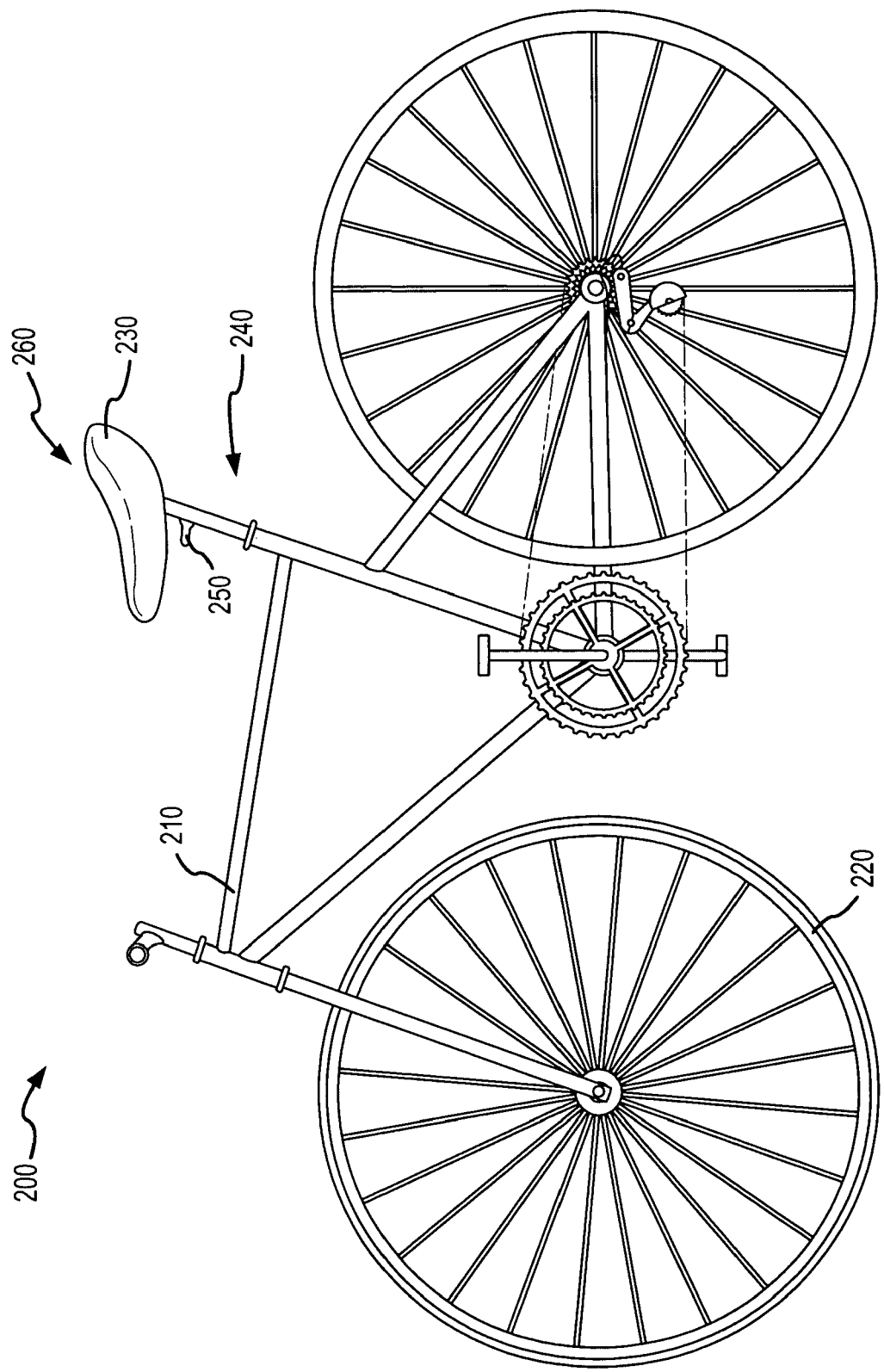
FIG. 5 is a simplified side view of a bicycle according to the present invention incorporating an adjustable seat mounting assembly.

With reference to FIG. 2A–3B and FIG. 5, a method of adjusting a bicycle seat height will be described. As depicted in FIG. 5, a bicycle 200 includes a bicycle frame 210 having at least one wheel 220 rotationally coupled thereto. A seat 230 on which a rider (not shown) will typically sit is coupled to frame 210 using an adjustable height bicycle seat mounting assembly 240. Seat mounting assembly 240 may be similar or identical to seat mounting assembly 100. Assembly 240 includes a lever or movement device 250 adapted to control the flow of a fluid through an internal orifice in seat mounting assembly 240. Movement device 250 may be similar or identical to lever 170. More specifically, movement of lever 170 as shown in FIG. 3B causes orifice 144 to be opened. A fluid disposed within a chamber 160 in a lower end of second tube 140 is able to pass or flow through orifice 144. The fluid of chamber 160 will strike a pressure balance with a compressible gas in chamber 162 absent other compressive forces on seat mounting assembly 240. Seat mounting assembly 100 is designed such that an unweighted bicycle seat will cause first and second tubes 110, 140 to be biased in an extended position such as shown in FIG. 2B. When orifice 144 is sealed (FIG. 3A) a rider may sit on seat 230 with seat 230 being axially stable. More specifically, tubes 140 and 110 will not telescopically move relative to one another when orifice 144 is closed.

When orifice 144 is opened (FIG. 3B), fluid is capable of passing between chamber 160 and cavity 162. The application of a compressive force shown by arrow 260 (FIG. 5) may be used to drive second tube 140 into first tube 110, effectively lowering the position of second tube 140. In this manner, the application of a sufficient axial force 260 will cause second tube 140 to telescopically slide relative to first tube 110. In the embodiment shown in FIG. 2B, second sealing member 120 and second tube 140 will slide downward in FIG. 2B while piston 114 remains stationary relative to first tube 110. As a result, fluid contained in chamber 160 is forced through orifice 144 to raise a top level of the fluid 164 in cavity 162. This process increases the gas pressure in cavity 162 containing the compressible gas or fluid. Upon release of lever or movement device 170, orifice 144 is sealed and first and second tubes 110, 140 will remain in the telescopic position at the time orifice 144 is closed.

As a result, a rider in the field, without tools and potentially without getting off of bicycle 200 can raise or lower seat 230. For example, operating lever 250 while sitting on seat 230 will cause seat mounting assembly 240 to compress, resulting in a lower seat position. When lever 250 is depressed while the rider is not sitting on seat 230, the increased gas pressure within cavity 162 operates to force the fluid through orifice 144 back into chamber 160. Again, this process occurs only when orifice 144 is opened by the appropriate movement of lever or movement device 170. Thus, when orifice 144 is closed, seat 230 will remain axially stable even when a rider gets off the bicycle or stands on the bicycle pedals removing their weight from seat 230. However, the opening of orifice 144 will cause tubes 140 and 110 to extend to an extended position such as that shown in FIG. 2B absent a compressive force 260.

In a preferred embodiment, first and second tubes 110, 140 are rotationally constrained. In this manner, second tube 140 is adapted to slide in and out of open end 122 of first tube 110, but not rotate relative to first tube 110. As a result, seat 230 can be raised or lowered without seat 230 being turned to the left or right as the seat height is adjusted. This feature is an improvement over prior-art seat mounting posts which, when loosened, allow both axial repositioning of bicycle seat 230 while simultaneously allowing the rotational positioning of bicycle seat 230. The means for arresting rotational movement of tubes 110 or 140 may take a variety of forms within the scope of the present invention. For example, a tongue and groove arrangement may be provided where a tongue, notch, ridge, or the like on an outer surface of second tube 140 slides within a groove located on an inner surface of first tube 110. In another embodiment, second tube 140 and/or the outer surface of second tube 140 has a non-circular cross-section or shape. For example, the cross section of second tube 140 or the outer surface thereof may be square, rectangular, oval, hexagonal, or the like. The inner surface of first tube 110 has a matching or similar shape. In this manner, the two tubes 110, 140 can telescope or axially slide relative to each other, but cannot rotate significantly relative to each other.

Figure 4:
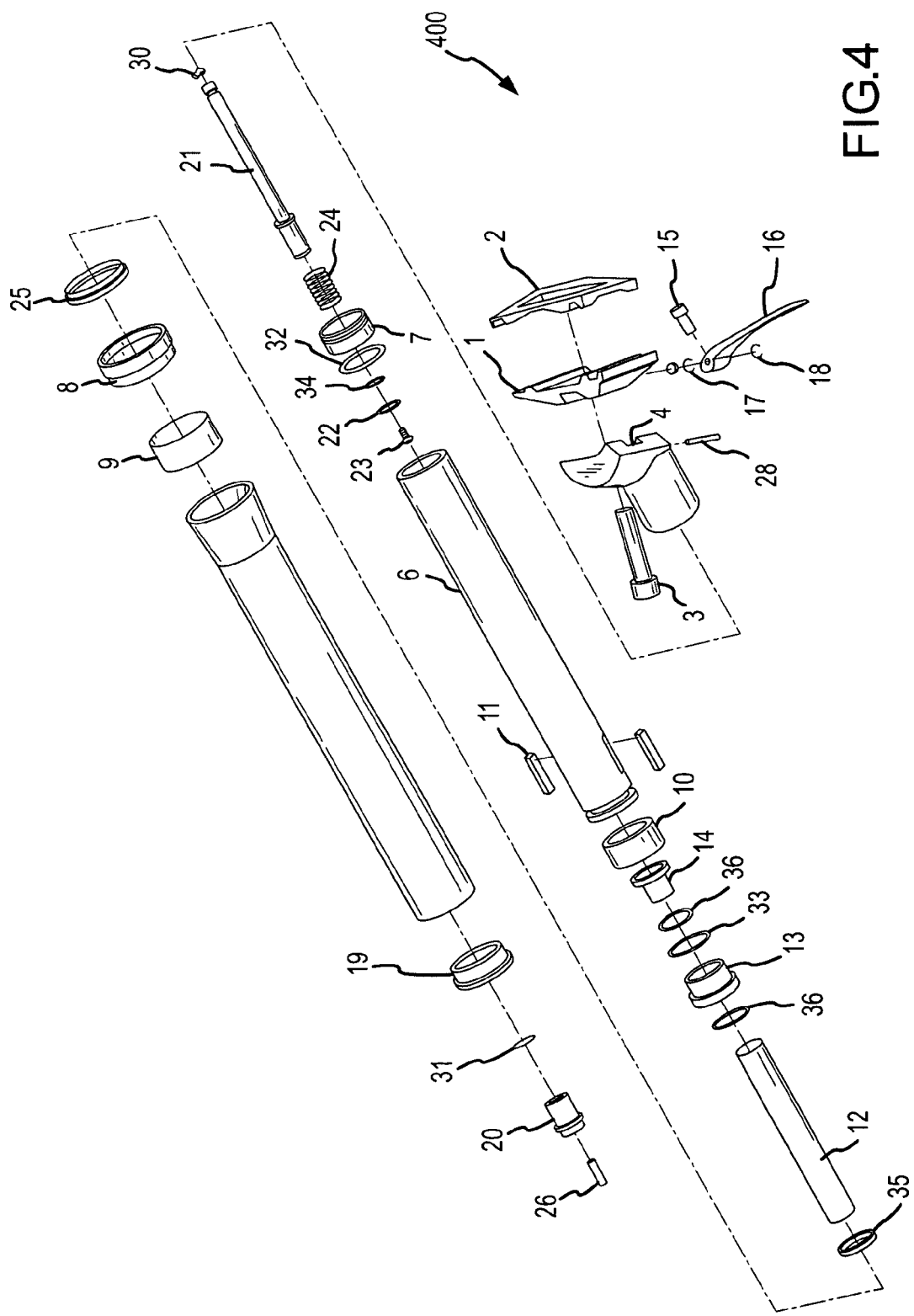
FIG. 4 is an exploded view of a seat mounting assembly according to one embodiment of the present invention.

Turning now to FIG. 4, a particular embodiment of a seat mounting assembly 400 according to the present invention will be described. It will be appreciated by those skilled in the art that the described embodiment is merely one of many ways the present invention may be manufactured or incorporated into new or existing bicycles. Further, some of the described components may be replaced, altered, added to or removed without departing from the scope of the present invention. As shown in FIG. 4, a lower clamp 1 and an upper clamp 2 are coupled together. Clamps 1 and 2 may be used, for example, to clamp to rails disposed underneath a bicycle seat. In this manner, the seat is coupled to seat mounting assembly 400. Clamps 1 and 2 have a hole disposed therethrough and adapted for receiving a bolt 3. Bolt 3 may further pass through a clamp head 4 that is adapted to receive lower clamp 1 in a nestled arrangement. A lever 16 is preferably coupled to a release rod 21. Lever 16 may correspond to movement device 170 depicted in FIG. 2B. Further, release rod 21 may correspond to rod 146 in FIG. 2B. Lever 16 is coupled to assembly 400 using an adjuster screw 15, a spacer 18, and/or a spring 17. Further, a pin 28 may operate to couple release rod 21 to lever 16.

Seat mounting assembly 400 includes an outer tube 5 and an inner tube 6. Inner tube 6 preferably has a bulkhead 7 disposed therein. Bulkhead 7 has an orifice passing therethrough as previously described. Release rod 21 includes or is coupled to a biasing member 24. In one embodiment, biasing member 24 is a spring valve. A sealing member is coupled to an end of release rod 21 to help seal orifice passing through bulkhead 7. The sealing member may comprise a pin head screw 23 coupled to a washer 22, and may further include one or more O-rings 34 and 32. Further, the upper end of release rod 21 may have one or more O-rings 30 disposed therewith to help create a seal at the top closed end of inner tube 6. As shown, inner tube 6 may have its closed end closed by mating with clamp head 4. In one embodiment, inner tube 6 has one or more glide blocks 11 disposed to an outer surface thereof. Glide blocks 11 are adapted to engage one or more glide rings 110. In this manner, the arrangement of glide blocks and glide rings helps prevent rotational movement between inner tube 6 and outer tube 5.

As previously described, in one embodiment outer tube 5 has a closed lower end. The lower end of outer tube 5 may be closed using the combination of a base cap 19, a spring valve 20, and a valve body 26. One or more O-rings 31 also may be used to help provide a fluidic seal at the end of outer tube 5. As previously noted, a compression rod or piston is disposed within outer tube 5. Compression rod 12 has a piston or end cap 14 coupled thereto that assists in forcing fluid contained within inner tube 6 through an orifice in bulkhead 7. As can be seen in both FIG. 4 and FIG. 2B, second sealing member 120 may be used to engage a lower end of inner tube 6 to help maintain a fluidic seal at the lower end of chamber 160. Second seal 120 may, for example, slide along the outer surface of compression rod 12 as inner tube 6 slides further into outer tube 5. Second seal 120, in one embodiment, includes an inner seal head 13, piston head 14, and one or more O-rings 33 and 36. The base of compression rod 12 may further include an O-ring 35 that helps form a portion of sealing member 118 as shown in FIG. 2B. Further, the interface between open end 122 of outer tube 5 may include a main seal head 8 disposed around an upper bushing 9. In one embodiment, a rod wiper 25 is further incorporated in the open end 122 of outer tube 5.

Seat mounting assemblies of the present invention may be used in the manufacture of new bicycles, as well as for the retrofit of existing bicycles. For example, in one embodiment the lowermost tube of assembly 100 is fixedly coupled to a bicycle frame to provide a primary support structure for the bicycle seat. In a retrofit example, an existing seat post is removed from a vertical tube member portion of the bicycle frame. The lower tube of seat mounting assembly 100 is then inserted into the vertical tube member portion. The lower tube of seat mounting assembly 100 may be affixed to the bicycle frame with a clamp or the like. Alternatively, the lower tube of seat mounting assembly is of sufficient length to provide sufficiently rigid support to the seat.

The invention has now been described in detail. However, it will be appreciated that the invention may be carried out in ways other than those illustrated in the aforesaid discussion, and that certain changes and modifications may be practiced within the scope of the appended claims. Accordingly, the scope of this invention is not intended to be limited by those specific examples, but rather to be accorded the scope represented in the following claims.

What is claimed is:

1. An adjustable height bicycle seat mounting assembly, comprising:
    first and second tubes in telescoping arrangement, the first tube coupled to a bicycle frame and the second tube coupled to a bicycle seat;
    a bulkhead disposed in one of the first and second tubes, the bulkhead having an orifice therethrough;
    a rod extending through the orifice and coupled to a movement device disposed near an end of the second tube, wherein the rod is movable between a first position and a second position;
    wherein the first and second tubes are axially adjustable relative to one another by regulating a flow of a fluid disposed in the first and second tubes; and
    a compressible gas disposed in a first portion of one of the first and second tubes; and
    wherein the fluid comprises a substantially incompressible fluid disposed in a second portion of one of the first and second tubes, the substantially incompressible fluid adapted to pass through the orifice when the rod is in the second position.

2. The seat mounting assembly as in claim 1 wherein a movement of the movement device opens the orifice by moving the rod.

3. The seat mounting assembly as in claim 1 wherein the movement device is a lever.

4. The seat mounting assembly as in claim 1 wherein the movement device is a cable.

5. The seat mounting assembly as in claim 1 wherein the movement device is disposed under the bicycle seat mounted to the second tube.

6. The seat mounting assembly as in claim 1 further comprising a biasing member adapted to bias the rod towards a position to close the orifice.

7. The seat mounting assembly as in claim 6 wherein the biasing member comprises a spring.

8. The seat mounting assembly as in claim 6 wherein the rod comprises a sealing member adapted to seal the orifice.

9. The seat mounting assembly as in claim 1 further comprising means for arresting rotational movement between the first and second tubes.

10. The seat mounting assembly as in claim 1 further comprising a piston disposed in the first tube and adapted to direct the fluid towards the orifice when the orifice is opened and an axially compressive force is applied to the bicycle seat.

11. The seat mounting assembly as in claim 1 wherein the first and second tubes are closed at opposing ends, and wherein the compressible gas is disposed in the closed end portion of the second tube above the bulkhead.

12. The seat mounting assembly as in claim 11 wherein the compressible gas creates a biasing effect on the fluid when the orifice is opened to bias the first and second tubes towards an extended positioned.

13. The seat mounting assembly as in claim 12 wherein the biasing effect is adapted to be overcome with an axially compressive force applied to the bicycle seat.

14. The seat mounting assembly as in claim 1 wherein the first and second tubes are closed at opposing ends, and wherein the compressible gas is disposed in the closed end portion of the first tube.

15. The seat mounting assembly as in claim 14 wherein the compressible gas Creates a biasing effect on a seal disposed at an open end of the second tube.

16. An adjustable height bicycle seat mounting assembly, comprising:
    an outer tube having a closed end;
    an inner tube having a closed end, the inner tube in telescoping arrangement with the outer tube;
    a bulkhead disposed in the inner tube having an orifice therethrough;
    an orifice seal adapted to open and close the orifice;
    a substantially incompressible fluid disposed within at least a portion of the outer tube and within at least a portion of the inner tube, the substantially incompressible fluid adapted to pass through the orifice when the orifice is in an open position; and
    a compressible gas disposed in at least one of the outer tube closed end and inner tube closed end, the compressible gas adapted to provide a biasing effect on the fluid when the orifice is in the open position to bias the inner and outer tubes towards an extended positioned.

17. The seat mounting assembly as in claim 16 wherein the outer tube is adapted to be coupled to a bicycle frame and the inner tube is adapted to be coupled to a bicycle seat.

18. The seat mounting assembly as in claim 16 wherein the outer tube is adapted to be coupled to a bicycle seat and the inner tube is adapted to be coupled to a bicycle frame.

19. The seat mounting assembly as in claim 16 wherein the orifice seal comprises a rod having a control mechanism disposed outside the inner and outer tubes.

20. A bicycle, comprising
    a frame;
    at least one wheel coupled to the frame to permit rotational movement of the wheel relative to the frame;
    a seat coupled to the frame with an adjustable height seat mounting assembly, the seat mounting assembly comprising:

first and second tubes in telescoping arrangement, the first tube coupled to the bicycle frame and the second tube coupled to the seat;

a bulkhead disposed in an inner one of the first and second tubes, the bulkhead having an orifice therethrough;

a sealing device adapted to seal the orifice when in a first position, and adapted to open the orifice when in a second position; and a sealing device controller having at least a portion disposed outside the first and second tubes, the sealing device controller adapted to control the sealing device position between at least the first and second positions;

wherein the first and second tubes are axially adjustable relative to one another by regulating a flow of a fluid disposed in the first and second tubes through the orifices;

a compressible gas disposed in a first portion of the inner one of the first and second tubes; and wherein the fluid comprises a substantially incompressible fluid disposed in a second portion of the inner one of the first and second tubes, the substantially incompressible fluid adapted to pass through the orifice when the sealing member is in the second position.

21. The bicycle as in claim 20 wherein the seat mounting assembly further comprises a biasing member adapted to bias the sealing device in the first position.

22. The bicycle as in claim 20 wherein the seat mounting assembly is axially fixed when the sealing device is in the first position.

23. The bicycle as in claim 20 wherein the seat mounting assembly is axially adjustable when the sealing device is in the second position.

24. The bicycle as in claim 20 wherein the seat mounting assembly first and second tubes are closed at opposing ends, and wherein the compressible gas is disposed in the closed end portion of at least one of the first and second tubes.

25. The bicycle as in claim 20 wherein the seat mounting assembly further comprises means for arresting rotational movement between the first and second tubes.

26. The bicycle as in claim 25 wherein the means for arresting rotation movement operates to arrest rotational movement when the first and second tubes are axially adjusted.

27. A method of adjusting a bicycle seat height, the method comprising:

providing a bicycle having an adjustable height bicycle seat mounting assembly, the seat mounting assembly comprising;

first and second tubes in telescoping arrangement, the first tube coupled to a bicycle frame and the second tube coupled to a bicycle seat;

a bulkhead disposed in one of the first and second tubes, the bulkhead having an orifice therethrough;

a rod extending through the orifice and coupled to a movement device disposed outside of and near an end of the second tube;

a substantially incompressible fluid disposed in a portion of the first and second tubes that flows through the orifice when the rod is in an open position; and a compressible gas disposed in a closed end portion of at least one of the first and second tubes, the gas creating a biasing effect on the fluid when the orifice is in the open position to bias the first and second tubes towards an extended position;

moving the movement device from outside the first or second tubes to position the rod in the open position;

releasing the movement device to seal the orifice when the seat is at a desired location.

28. The method as in claim 27 further comprising applying a compressive load to the seat to cause the first and second tubes to telescope to a desired position.

29. The method as in claim 28 wherein the compressive load is greater than the biasing effect to lower the seat desired position.

30. The method as in claim 20 wherein the biasing effect is greater than the compressive load to raise the seat desired position.

* * * * *